Patented June 29, 1926.

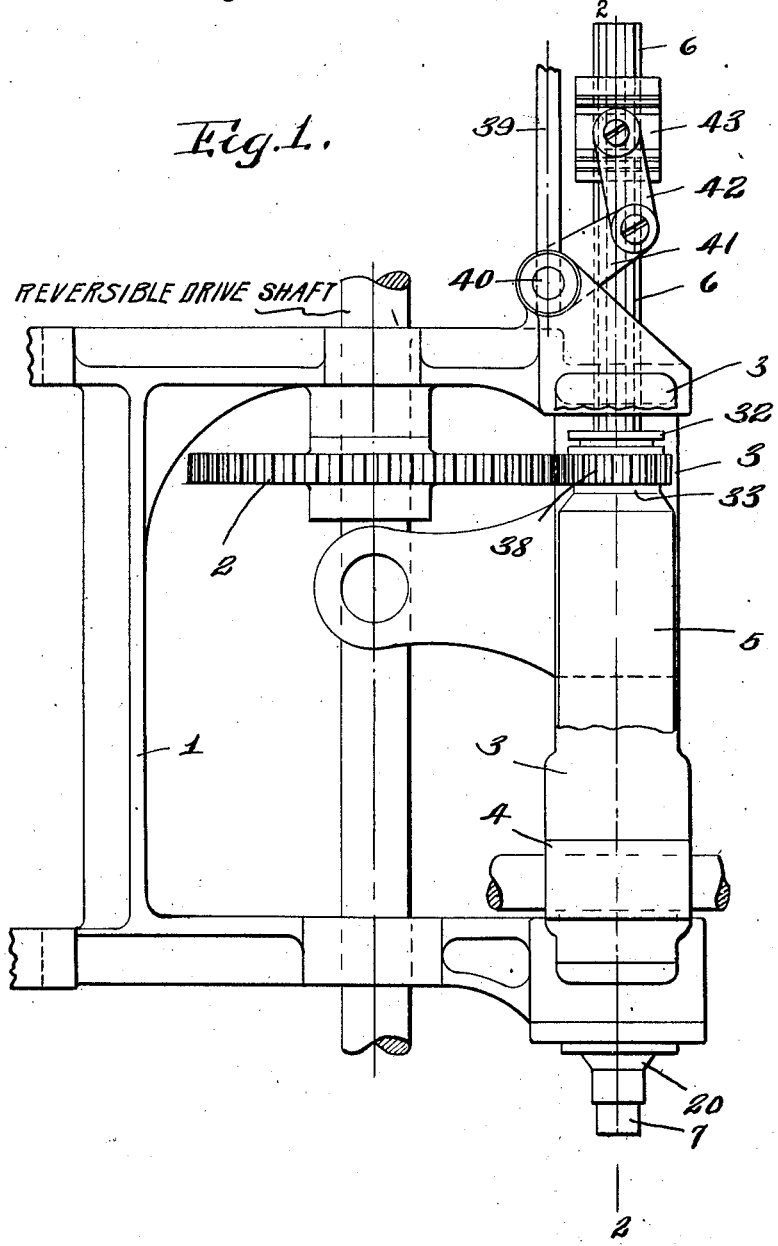

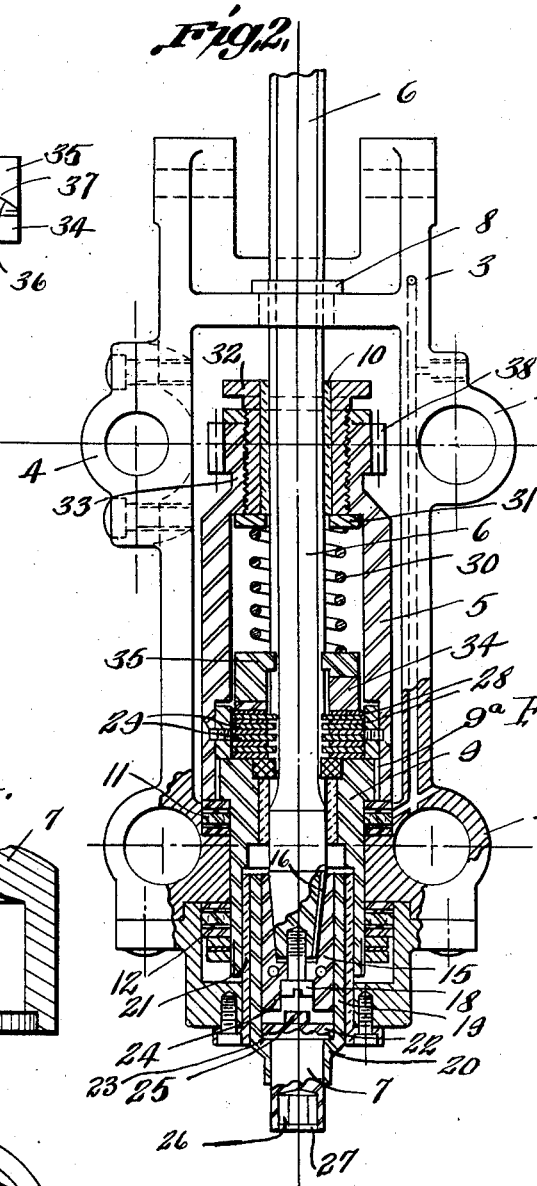

1,590,670

UNITED STATES PATENT OFFICE.

SPENCER K. BROWN, OF SYRACUSE, NEW YORK, ASSIGNOR TO THE BLACK & DECKER MANUFACTURING COMPANY, OF TOWSON, MARYLAND, A CORPORATION OF MARYLAND.

SCREW AND NUT DRIVING MACHINE.

Application filed March 3, 1921, Serial No. 449,305. Renewed April 29, 1926.

This invention relates to screw and nut driving machines of the type described in my Patent No. 1,320,375 issued November 4, 1919, and has for its object a particularly simple and efficient means for effecting the engagement and disengagement of the wrench head from the driver therefor, and a particularly simple and efficient means for increasing the driving force to be applied to the screw or nut when it is desired to unscrew the screw or nut.

The invention consists in the novel features and in the combinations and constructions hereinafter set forth and claimed.

In describing this invention, reference is had to the accompanying drawings in which like characters designate corresponding parts in all the views.

Figure 1 is a fragmentary elevation of this machine, the motor being omitted.

Figure 2 is a sectional view looking to the left taken on line 2—2, Fig. 1.

Figures 3 and 4 are respectively, an enlarged end elevation and sectional view of the wrench head.

Figure 5 is a detail view of the cams for additionally tensioning the friction clutch spring when the machine is operated to unscrew the screws or nuts.

Figures 6 and 7 are face views of the cams or collars shown in Fig. 5.

Figure 8 is an enlarged fragmentary view of the clutch teeth of the driving and driven sections of the driven element.

This screw driving machine comprises generally rotatable driving and driven elements, the driven element including two sections, a friction clutch connecting the driving element and the driving section of the driven element, the sections of the driven element having clutch teeth on their opposing ends and being normally spaced apart, the driving section of the driven element being shiftable axially to engage and disengage the clutch teeth, and said clutch teeth being shaped to initially engage and slip past each other when the driving section is first shifted axially and quickly separate the sections when the force applied to the driving section to move it axially, is discontinued.

1 designates the main frame of the machine which may be of any suitable form, size and construction to carry a motor which may be an electric motor or a compressed air motor which actuates a suitable driving gear 2.

3 is a head or frame carried by the main frame 1 and carrying the screw and nut driving mechanism forming the subject matter of this invention, this head 3 being suitably carried by the main frame. The main frame and head are here shown as formed with bearings 4 which slidably receive guide rods fixed to a suitable support as a carriage along which rods the frame slides to position the nut driving mechanism relatively to the work. This head is usually carried in vertical position but may be arranged in any convenient position to operate on the work.

5 is the driving element and 6 and 7 are the driving and driven sections of the driven element, the driving element 5 being here shown tubular, and the driving section 6 of the driven element comprising usually a shaft extending axially through the driving element and through a bearing 8 at the top of the head 3 and parts carried at the lower end of the shaft and journaled in bearings 9 in the lower end of the head 3.

The driving element 5 has a bearing 10 on the shaft 6 of the driven element and coacts at its lower end with a thrust or journal bearing 11 on the frame head.

The driving element 5 is also fixed by keys 9ª to the bearing or sleeve 9 extending through the lower end of the frame head 3 and journaled therein by the bearings 11 which are common to the driving element 5 and sleeve 9. In fact, this sleeve is practically a unit with the driving element. Additional bearings 12 are interposed between the lower end of the bearing or sleeve 9 and the frame head 3. The driving section or shaft of the driven element extends through the driving element 5 into the sleeve or bearing 9 and has a head 15 mounted on the lower end thereof which is keyed thereto at 16 and held from displacement by a screw 18. This head fits into a tool holder or sleeve 19 having a contracted lower end 20 in which the driven section 7 or tool of the driven element is located. The sleeve 19 is journaled in a suitable bearing or bushing 21 located in the lower end of the frame head and arranged between the sleeve 19 and the bearing or sleeve 9. The driven section 7 is here shown as a wrench head having an enlargement or collar 22 within the sleeve 19 and shouldering at 23 against the inner annular face of the contracted part 20 of the sleeve 19.

The head 15 of the driving section and the enlargement or head 22 of the driven section are provided with clutch teeth 24, 25 on their opposing faces, the clutch teeth being shaped to facilitate separation of the driving and driven sections when the force tending to move the driving section or shaft 6 downwardly is discontinued. As here shown, the teeth are tapered, as shown in Figure 8 from their bases toward their tops, this taper being slight substantially 2½° but the taper is sufficient to cause the teeth to cam apart or separate when the driven section 7 is stopped from rotation as when the nut or screw is turned to its fullest extent and the driving section continues to be rotated by the driving element.

The wrench head or driven section 7 is formed with a polygonal or hexagonal socket, and with means at the entrance of the socket for guiding the head of a screw or nut into the socket, this means being here shown as a countersunk annular recess 26, the socket opening through the bottom of the recess at the angles of its sides. This recess is also applicable to hand operated socket wrenches.

When the machine is in operation, the wrench head or section 7 is usually rotating by its own momentum when the sections 6, 7 are disengaged, that is, when the clutch teeth 24, 25 are separated. When the section 6 is first moved downwardly, the sleeve 19 also moves therewith, thus moving the wrench head 7 downwardly onto a nut and this wrench head is rotating by the momentum of the previous operation or by the cuffing or knocking action of the clutch teeth 24 on the ends of the teeth 25. The recess 27 encloses the top of the nut and holds the nut centered until it slips into the socket 26. The machine is then shifted to bring the nut over the screw to receive it and the section 6 moved downwardly to fully engage the clutch faces 24, 25 whereupon the nut is turned on the screw.

The sleeve 19 moves downward when the shaft section 6 is moved downward, for the reason that the clutch teeth 24 hitting on the ends of the clutch teeth 25 force the wrench head 7 downwardly rather than come into interlocking engagement with the teeth 25, and such downward forcing of the wrench head 7 carries the sleeve 19 downwardly until movement is stopped by the wrench head engaging the nut. Also the friction between the head 15 and the sleeve 19 tends to carry the sleeve 19 up and down with the head.

If the wrench head 7 is not rotating, or if the nut has been started by hand on the screw, when the clutch teeth 24 commence or initially engage the clutch teeth 25, owing to the rapid rotation of the shaft 6, the clutch teeth 24 merely cuff and slip past the clutch teeth 25, rotating the wrench head 7 on the nut in the recess 27 sufficiently to at some point, bring the sides of the socket in alinement with the sides of the nut so that the nut slips from the recess into the socket. This cuffing operation is possible owing to the taper of the clutch teeth 24, 25.

Owing to the recess 27 it is practical to feed the nuts from a magazine, as it is not necessary to fit the nuts into the socket 26 of the wrench head by hand or to place them by hand on the screws. It will be understood that the frame of the machine is suitably mounted to permit it to be swung horizontally and vertically to suit the convenience of the operator. This mounting of the frame forms no part of this invention.

The driving element 5 and the section 6 of the driven element are connected together by a friction disk clutch as in my patent referred to the clutch consisting of interleaved disks 28 and 29 keyed respectively to the driving element 5 and shaft 6, these disks being pressed together by a spring 30 coiled about the shaft 6 within the element 5 and thrusting at one end against an adjustable spring abutment 31 and at its other end toward the disks to press them against the upper end of the member or sleeve 9.

The spring is initially tensioned to exert sufficient pressure on the disks to drive the nut to turn the same to its final position and then to slip when the nut becomes stationary in its final position in case the operator continues to press the shaft 6 downwardly. The abutment 31 is adjustable by means of a sleeve 32 encircling the bearing or bushing 10 and threading in the neck or upper portion 33 of the driving element 5.

Obviously, it will require slightly more friction to unscrew a nut than to screw it in position and in order to meet this condition, I have provided a particularly simple and efficient means for automatically increasing the tensioning of the spring 30 when the machine is used to unscrew nuts or screws.

As here shown, this means comprises cams, one operable by the driving element 5 and the other forming an abutment for one end of the spring 30, the cams having inclined faces which act to move the spring abutment cam axially and hence compress the spring when the driving element is rotated in a reverse direction. As here illustrated, these cams are collars 34, 35, the collar 34 being rotatable with the driving element 5 or the disks 28 associated with the driving element and the collar 35 being slidable on the shaft 6 and forming an abutment for the lower end of the spring 30. The collars are provided with complemental inclined or cam surfaces 36, 37 on their opposing faces so that when the driving element 5 is rotated in the reverse direction the collar 35 is shifted upwardly riding upon the cam faces 36, 37, thus additionally tensioning the spring sufficiently to cause the disks 28, 29 to positively engage without slipping. The collar 34 is fricitionally connected to the driving element 5 through the uppermost driving disk 28 on the clutch on which it rests and from which it receives rotatable movement.

The motor gear 2 meshes with a suitable gear 38 on the driving element 5 and when an air motor is used the motor itself is reversed and when the electric motor is used suitable reverse gear is formed, these features forming no part of this invention.

The shaft 6 is fed downwardly by said lever 39 pivoted at 40 to the frame and connected by links 41, 42 to a collar 43 fixed to the upper end of the shaft 6.

In operation, the workman first swings the frame 1 to position the wrench head 7 over the nut and the lever 39 is pulled forwardly or to the right Fig. 1. This movement first feeds the shaft 6 and wrench head 7 axially until the annular recess 27 encloses the top of the nut when additional downward movement shifts the shaft 6 downwardly relatively to the wrench head causing the clutch teeth 24 at the lower end thereof to first cuff and slip past the clutch teeth 25 on the wrench head 7, thus turning the wrench head so that the walls of the socket 26 aline with the sides of the nut and the nut slips into the socket 26 as the shaft 6 moves downwardly to positively engage the clutch teeth 24, 25. All the foregoing operations take place without the exercise of any skill by the workman who merely swings the machine to position the wrench head and pulls down naturally on the handle 39. When the nut has been screwed down the friction disks 28, 29 slip. The operator then releases the handle 39 and the shaft 6 moves automatically upwardly owing to the taper of the clutch teeth 24, 25. The operation is then repeated. When continuously operated it requires about .6 of a second to drive each nut.

In unscrewing and removing nuts, the operator moves the machine to place the wrench head 7 on the nut and proceeds the same as before except that the direction of rotation of the motor or shaft 6 is reversed, the direction of rotation of the shaft 6 being reversed due to the direction of rotation of the gear 2, the shaft on which it is mounted, being reversed through suitable reversing mechanism.

If when the wrench head 7 is placed on the nut, the nut is so tightly set that the driving disks 28 slip relatively to the driven disks 29, the cam collar 34 is turned with the driving disks causing the inclined surfaces 36 of the collar 34 to slide under the surfaces 37 of the spring abutment collar 35 and shift the collar 35 upwardly to additionally tension the clutch spring 30 sufficiently to hold the disks 28, 29 engaged without slipping so that the wrench head 7 is turned to unscrew the nut. This machine is equally applicable to driving cap screws or screws with slotted heads.

What I claim is:

1. In a screw and nut driving machine, the combination of a rotating driving element, a rotating driven element, a friction clutch connecting said elements, a spring for normally engaging the clutch during rotation of the driving element forwardly, means for actuating the driving element in either direction, and means for automatically additionally tensioning the spring during movement of the driving element in the reverse direction, substantially as and for the purpose described.

2. In a screw and nut driving machine, the combination of a rotating driving element, a rotating driven element, a friction clutch connecting said elements, a spring for normally engaging the clutch during rotation of the driving element forwardly, means for actuating the driving element in either direction, and means for automatically additionally tensioning the spring during movement of the driving element in the reverse direction, said means comprising an axially movable spring abutment at one end of the spring, and cam means rotatable with the driving member and arranged to shift the abutment axially to tension the spring during movement of the driving member in reverse direction, substantially as and for the purpose set forth.

3. In a screw and nut driving machine, the combination of a rotating driving element, a rotating driven element, a friction clutch connecting said elements, a spring for normally engaging the clutch during rotation of the driving element forwardly, means for actuating the driving element in either direction, and means for automatically additionally tensioning the spring during movement of the driving element in the reverse direction, said means comprising collars rotatable respectively with the driving and driven elements, the collar on the driven element being in abutment for one end of the spring and the collars having cams on their opposing faces arranged to separate the collars when the driving element is turned in reverse direction and permit the collars to come toward each other and the spring to expand when the driving member is rotating in a forward direction, substantially as and for the purpose specified.

4. In a screw and nut driving machine, the combination of a driving element, a driven element arranged axially of the driving element, a friction clutch connecting said elements, a collar encircling the driven element and rotatable with a friction member of the driving element, a collar slidable axially of the driven element, the collars having cam faces on their opposing sides for spreading the collars apart during relative rotation of the driving element relatively to the driven element in one direction, and a compression spring abutting against the axially shiftable collar tending to press the collars and the friction members of the clutch together, substantially as and for the purpose set forth.

5. In a screw and nut driving machine, the combination of a driving element, a driven element extending coaxially of the driving element, a friction clutch interposed between the driving and driven elements, a collar encircling the driven element and being disconnected therefrom and frictionally engaged with one of the disks connected to the driving element, a collar mounted rotatable with the driven element and slidable axially thereof, the collars having cam faces on their opposing faces whereby upon relative rotation upon the driving and driven elements in one direction, the collar associated with the driven element is moved axially, a spring encircling the driven element and pressing at one end against the collar on the driven element and at its other end against the driving element, substantially as and for the purpose described.

In testimony whereof, I have hereunto signed my name at Syracuse, in the county of Onondaga, and State of New York, this 16th day of December, 1920.

SPENCER K. BROWN.